United States Patent
Park et al.

(10) Patent No.: US 9,001,442 B2
(45) Date of Patent: Apr. 7, 2015

(54) DETECTION OF ADJACENT TRACK INTERFERENCE USING SIZE-ADJUSTABLE SLIDING WINDOW

(71) Applicant: Seagate Technology LLC, Cupertino, CA (US)

(72) Inventors: Donghyuk Park, Seoul (KR); Seungyoul Jeong, Kyunnggi-Do (KR); Joowon Cho, Kyunnggi-Do (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/840,650

(22) Filed: Mar. 15, 2013

(65) Prior Publication Data

US 2014/0268387 A1    Sep. 18, 2014

(51) Int. Cl.
*G11B 27/36* (2006.01)
*G11B 20/10* (2006.01)

(52) U.S. Cl.
CPC .......... *G11B 27/36* (2013.01); *G11B 20/10305* (2013.01)

(58) Field of Classification Search
None
See application file for complete search history.

(56) References Cited

U.S. PATENT DOCUMENTS

| | | | |
|---|---|---|---|
| 5,721,816 A | 2/1998 | Kusbel et al. | |
| 7,493,550 B1 | 2/2009 | Kou et al. | |
| 8,300,339 B1 | 10/2012 | Nangare et al. | |
| 8,379,498 B2 | 2/2013 | Mathew et al. | |
| 8,429,507 B1 | 4/2013 | Kou et al. | |
| 8,441,750 B1 | 5/2013 | Nangare et al. | |
| 8,537,482 B1 | 9/2013 | Song et al. | |
| 8,659,847 B1 * | 2/2014 | Yeung et al. | 360/53 |
| 8,867,155 B2 * | 10/2014 | Okubo | 360/39 |
| 2008/0130154 A1 * | 6/2008 | Mettler et al. | 360/53 |
| 2008/0151704 A1 * | 6/2008 | Harada | 369/30.22 |
| 2008/0174905 A1 * | 7/2008 | Ueda | 360/77.04 |
| 2010/0290151 A1 * | 11/2010 | Kondo et al. | 360/71 |
| 2011/0292536 A1 * | 12/2011 | Hongawa et al. | 360/55 |
| 2012/0020395 A1 * | 1/2012 | Domanovitz et al. | 375/222 |
| 2012/0063022 A1 | 3/2012 | Mathew et al. | |
| 2012/0063023 A1 | 3/2012 | Mathew et al. | |
| 2012/0063024 A1 | 3/2012 | Mathew et al. | |
| 2012/0063284 A1 | 3/2012 | Mathew et al. | |
| 2012/0105994 A1 * | 5/2012 | Bellorado et al. | 360/45 |
| 2013/0021689 A1 | 1/2013 | Haratsch et al. | |
| 2013/0070362 A1 * | 3/2013 | Mathew et al. | 360/65 |
| 2013/0083417 A1 | 4/2013 | Worrell et al. | |
| 2013/0083418 A1 | 4/2013 | Worrell et al. | |
| 2013/0194699 A1 * | 8/2013 | Matsuo et al. | 360/77.08 |

(Continued)

OTHER PUBLICATIONS

Change, et al; "Inter Track Interference Mitigation for Bit-Patterned Magnetic Recording," IEEE Transaction on Magnetics, col. 46, No. 11, Nov. 2010; 10 pgs.

(Continued)

*Primary Examiner* — Dismery Mercedes
(74) *Attorney, Agent, or Firm* — Taylor English Duma LLP

(57) ABSTRACT

Technologies are described herein for detecting adjacent track interference in a storage device using a size-adjustable sliding window. A value for an inter-track interference factor associated with at least one adjacent track is determined for a first area of a data track of the storage device. The first area may encompass a plurality of sectors of the data track. Next, it is determined whether the value of the calculated inter-track interference factor is greater than a threshold value, and if so, an indication of inter-track interference corresponding to the first area is stored in the storage device.

18 Claims, 6 Drawing Sheets

(56) References Cited

U.S. PATENT DOCUMENTS

2013/0201579 A1* 8/2013 Springberg et al. ............. 360/75
2013/0223199 A1  8/2013 Lund et al.
2014/0029133 A1* 1/2014 Tagami et al. ................. 360/75
2014/0071559 A1* 3/2014 Toda et al. ..................... 360/55

OTHER PUBLICATIONS

Haratsch, et al.; "Interfrack Interference Cancellation for Shingled Magnetic Recording," IEEE Transactions on Magnetics, vol. 47, No. 10, Oct. 2011, 6 pgs.

Roh, et al.; "Single-Head/Single-Track Detection in Interfering Tracks," IEEE Transactions on Magnetics, vol. 38, No. 4, Jul. 2002, 9 pgs.

Wikipedia; "Cross-correlation", located at "http://en.wikipedia.org/wiki/Cross-correlation", last modified on Feb. 25, 2013, 4 pgs.

Jeong, Seungyoul; U.S. Patent Application Entitled: Size Adjustable Inter-Track Interference Cancellation, U.S. Appl. No. 13/942,163, filed Jul. 15, 2013; 25 pgs.

* cited by examiner

DETECTION OF ADJACENT TRACK INTERFERENCE USING SIZE-ADJUSTABLE SLIDING WINDOW

BRIEF SUMMARY

The present disclosure relates to technologies for detecting adjacent track interference in a storage device, such as a hard-disk drive ("HDD") device, using a size-adjustable sliding window ("SASW"). According to some embodiments, a method of detecting adjacent track interference in a storage device comprises determining a value for an inter-track interference factor associated with at least one adjacent track in a first area of a data track of the storage device. The first area may encompass a plurality of sectors of the data track. Next, it is determined whether the value of the inter-track interference factor is greater than a threshold value, and if so, an indication of inter-track interference corresponding to the first area is stored in the storage device.

According to further embodiments, a computer-readable storage medium comprises processor-executable instructions that, when executed by a processor, cause the processor to determine a value for an inter-track interference factor associated with at least one adjacent track in a first area of a data track of a storage device, the first area encompassing a plurality of sectors of the data track. The processor may then determine whether the value of the inter-track interference factor is greater than a threshold value, and if so, store an indication of inter-track interference corresponding to the first area in the storage device.

According to further embodiments, a system comprises a storage device comprising a storage medium, a processor operably connected to the storage device, and an inter-track interference detection module. The inter-track interference detection module may be configured to cause the processor to determine a value for an inter-track interference factor associated with at least one adjacent track in a first area of a data track of the storage medium, determine whether the value of the inter-track interference factor is greater than a threshold value, and upon determining the value of the inter-track interference factor is greater than the threshold value, store an indication of inter-track interference corresponding to the first area in the storage device. The stored value of the inter-track interference factor corresponding to the first area may be utilized by a controller of the storage device to read data from the first area of the data track.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
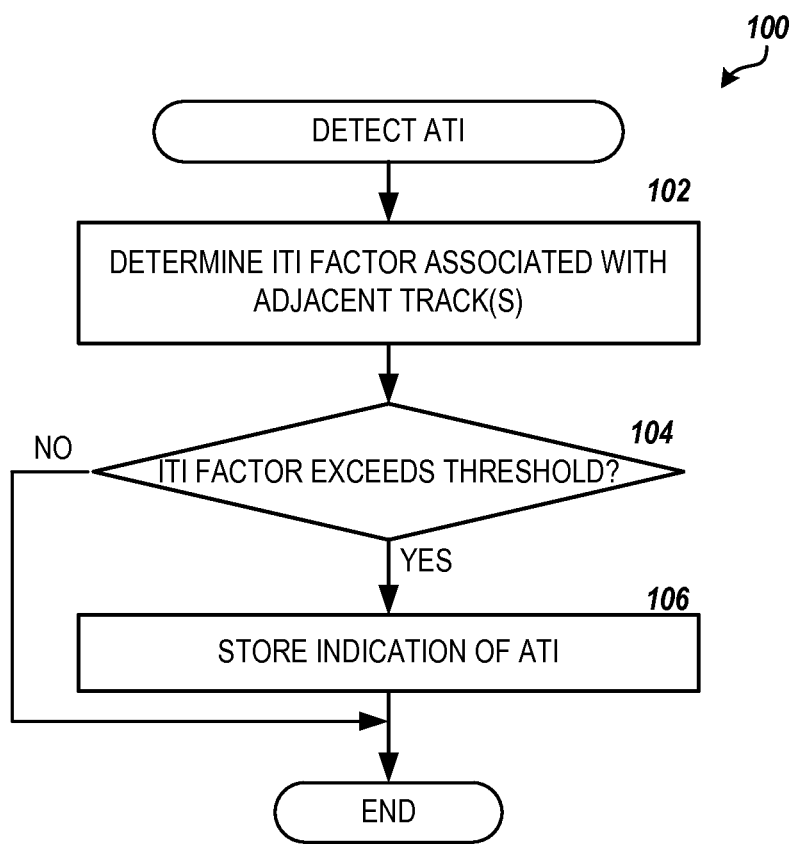
FIG. 1 is a flow diagram showing one method for detecting adjacent track interference, according to embodiments described herein.

The following detailed description is directed to technologies for detecting adjacent track interference in a storage device using a size-adjustable sliding window. A typical storage device may include a hard-disk drive ("HDD") device. The HDD device may contain a number of magnetic storage disks that include a number of concentric data tracks, the data tracks divided into sectors that contain the data stored on the device. As the storage capacity of HDD devices increase, the density of data tracks on the storage disks may also increase. This increase in track density may give rise to inter-track interference ("ITI") comprising interference in the read signal from a reader head of the HDD device when reading a target data track (referred to as track N) caused by the data stored in adjacent or neighboring tracks (referred to as tracks N−1, N−2, N+1, N+2, etc.). The effect of ITI on the read signal may be further exacerbated by head misalignment, the size of the reader head, angle or skew of the reader head in regard to the target track N, or the use of shingled magnetic recording ("SMR") in recording the data tracks and the like.

The read channel and/or controller of a typical HDD device may include a mechanism for compensating for ITI in the read signal of the target data track N. For example, the ITI compensation ("ITIC") mechanism may include circuitry or software that reads the data from the nearby sectors of the adjacent tracks, e.g., N−1, N+1 and the like, in order to calculate one or more ITI factors that describe the nature of the influence of the data from adjacent tracks in the read signal from the target track N. These ITI factors may include an "alpha" factor indicating a magnitude of interference on a target track from an adjacent track. The ITI factors may alternatively or additionally include a "cross-correlation" factor that indicates a correlation between the signal from the target track and that of the adjacent track(s). The ITIC mechanism may further include circuitry and/or software that apply the determined ITIC factors to the read signal from the target track to mathematically cancel the inference from the adjacent track(s).

In further embodiments, the read channel and/or controller of the HDD device may calculate ITI factor values describing adjacent track interference in addition to or as an alternative to a traditional ITIC mechanism. For example, the controller of the HDD may read data from a target track N at varying read-offsets of the reader head in regard to the data track, such as +5%, then −5%, +10%, −10%, +15%, etc., until the data is read without error or interference from adjacent tracks. The read-offset at which the data was successfully read from the target track may be used as the ITI factor.

According to embodiments presented herein, a calculation of ITI factors and determination of ITI for various areas of the data tracks in an HDD device may be determined at a point before the device is utilized in normal operation, also referred to herein as the user mode. An indication of the presence of ITI in each area of the data track, as well as the applicable ITI factors, may be stored in a memory of the controller of the HDD device. When reading from a sector contained within or otherwise associated with an area of a data track of the HDD device in the user mode, the indication of ITI stored for that area and/or the stored ITI factors may be utilized to read the data while compensating for ITI from adjacent tracks. Similarly, when a read error occurs in a sector contained within or otherwise associated with an area of a data track, the indication of ITI and/or the stored ITI factors for that area may be utilized to adjust the read parameters in the read channel while performing the read retry, potentially allowing for faster recovery from the read error.

FIG. 1 provides an overview of the ITI detection methods and processes described herein. Specifically, FIG. 1 illustrates one routine 100 for detecting adjacent track interference in a storage device. According to some embodiments, the routine 100 may be performed by a controller of the storage device. In other embodiments, the routine 100 may be performed by a computing system external to and operably connected to the storage device. In some embodiments, the routine 100 may performed at a point before user mode of the storage device, such as during a burn-in ("B/I") or testing process of the storage device by the manufacturer, The routine 100 includes step 102, where a value for an ITI factor is determined for a particular area, also referred to herein as a "window," of the target data track N of the storage device. For example, the ITI detection module 240 of FIG. 2 may determine a value for an alpha factor or a cross-correlation factor of the ITIC mechanism described above for compensating for adjacent track interference in the read signal for data track N contributed by track N−1 and/or track N+1. The ITI factor may be determined using an ITIC mechanism in the read channel of the storage device.

The routine 100 proceeds to step 104, where it is determined if the ITI factor value exceeds a threshold value. Exceeding the threshold value may indicate that interference from adjacent tracks is present and/or significant. If the ITI factor exceeds the threshold value, then the routine proceeds to step 106, where an indication that ITI was detected in the area of the data track is stored in a memory of the storage device. The threshold value may be set or determined by multiple methods utilizing metrics that are meaningful to a given system to achieve the desired tuning goals in the drive, which may include data integrity, error recovery, performance or areal density. The value of the ITI factor determined for the area of the target data track may also be stored along with the indication of ITI. According to embodiments, the controller of the storage device may utilize this stored indication of ITI and/or the stored ITI factor value when reading data from sectors associated with the area of the data track N. From step 106, the routine 100 ends.

Figure 2:
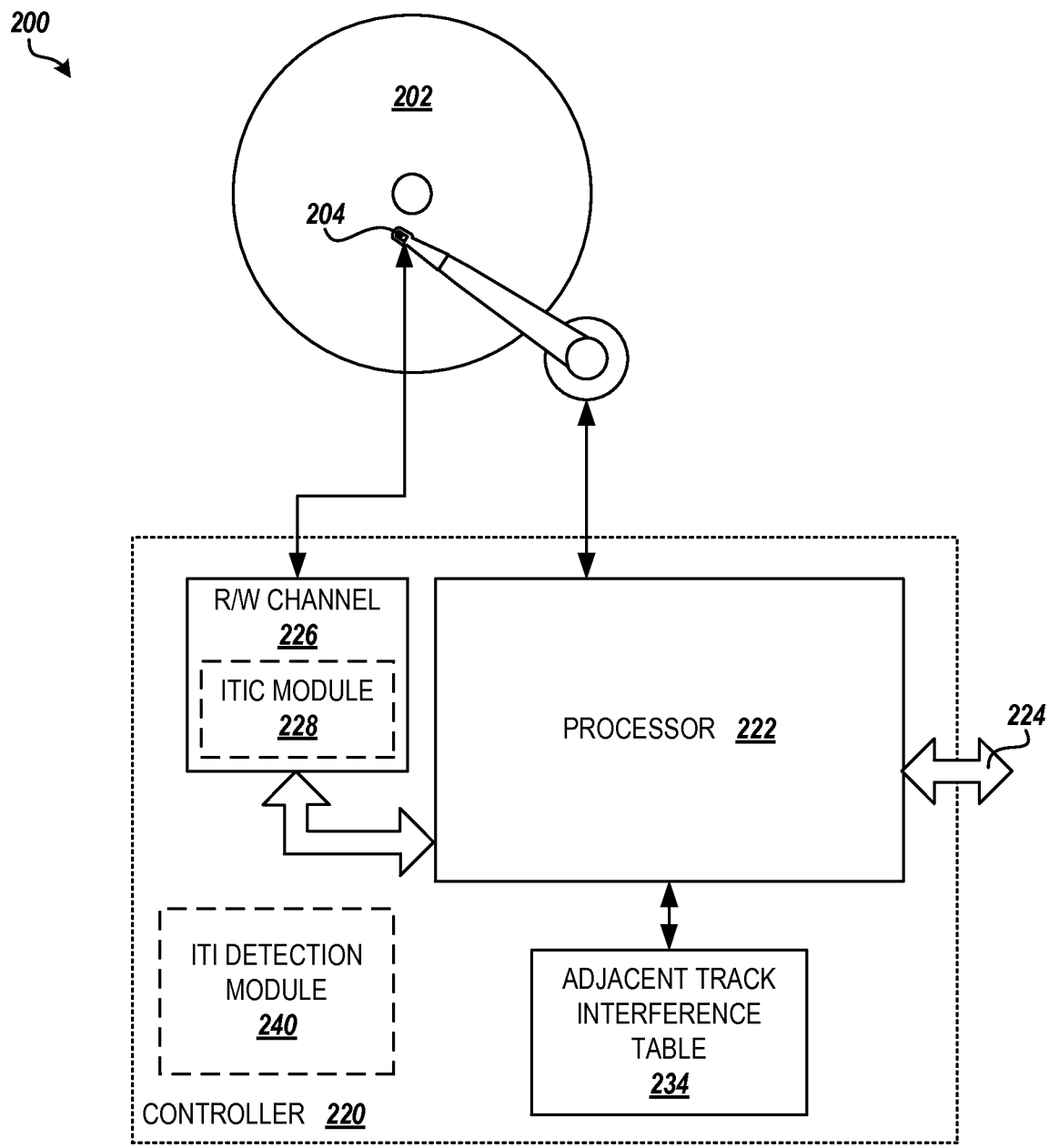
FIG. 2 is a block diagram showing an illustrative environment for detecting adjacent track interference in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for detecting adjacent track interference in the storage device 200, according to the embodiments provided herein. The storage device 200 may include storage media comprising at least one platter or disk 202.

The storage device 200 further includes at least one read/write head 204 located adjacent to the surface of each disk 202. The read/write head 204 may read information from the disk 202 by sensing a magnetic field formed on portions of the surface of the disk, and may write information to the disk by magnetizing a portion of the surface of the disk. It will be appreciated by one of ordinary skill in the art that the read/write head 204 may comprise multiple components, such as a magneto-resistive ("MR") or tunneling MR reader element, a writer element, an air bearing and the like.

Figure 3:
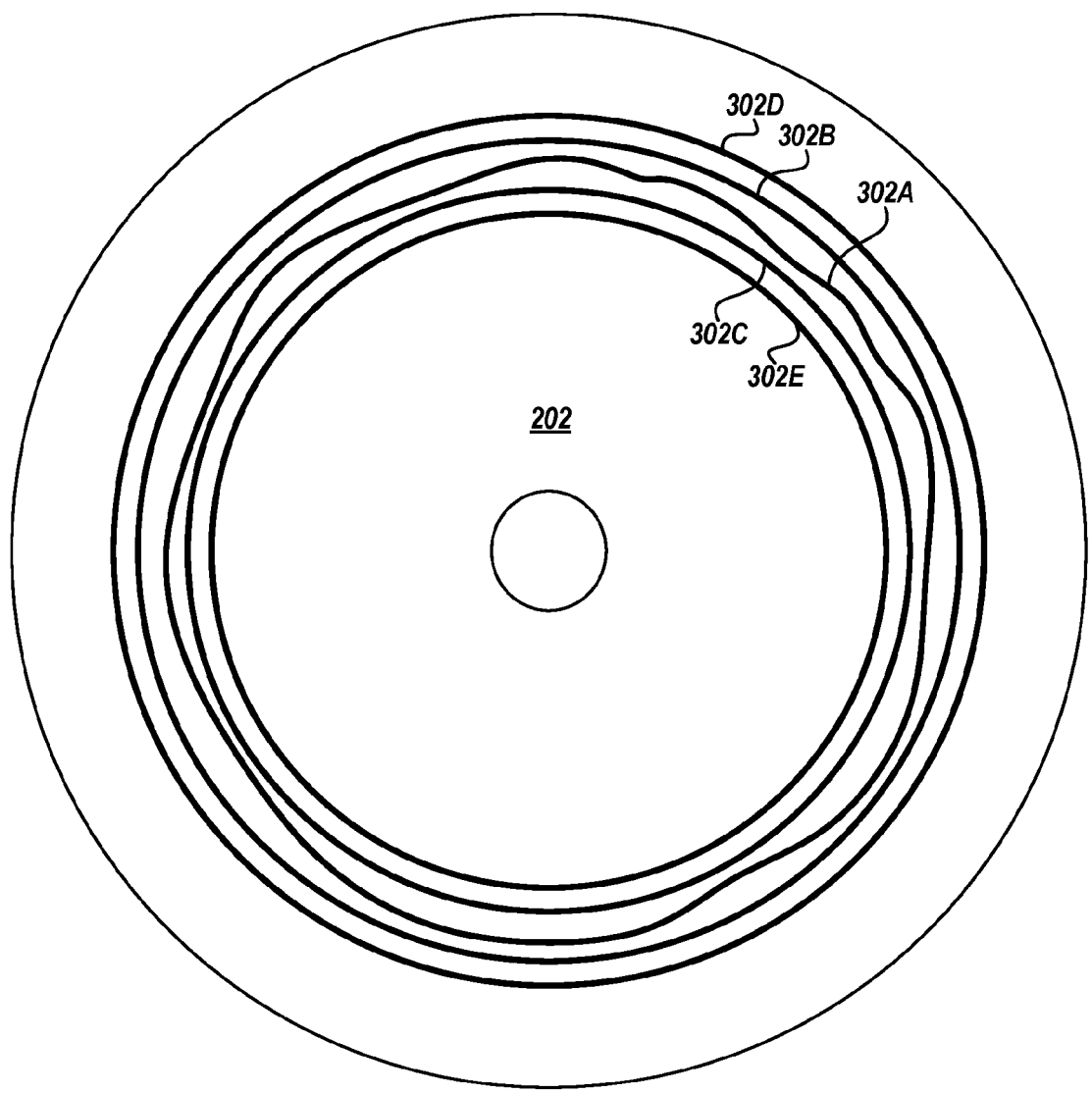
FIG. 3 is a block diagram showing an illustrative layout of data tracks on disk media, according to embodiments described herein.
Figure 4:
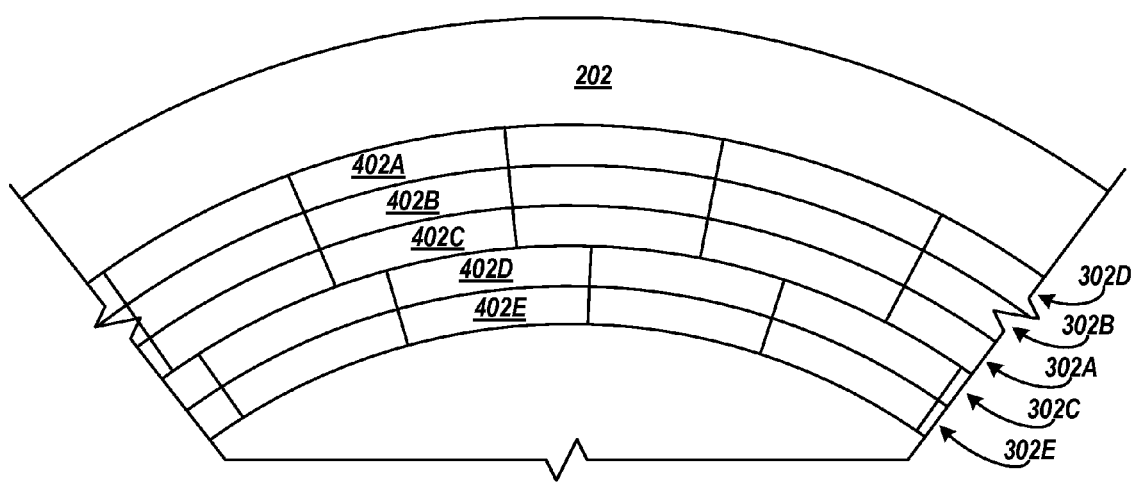
FIG. 4 is a block diagram showing an illustrative layout of sectors in data tracks on the disk media, according to embodiments described herein.

The surface of the disk 202 may be divided or "formatted" into a number of individual data tracks, such as data tracks 302A-302E (referred to herein generally as data tracks 302) shown in FIG. 3. The data tracks 302 may represent substantially concentric circular areas on the surface of the disk 202. However, because of factors such as platter shift, platter geometry irregularity, vertical and horizontal platter vibrations, air fluctuations and the like, each data track may not be perfectly circular, such as data track 302A. Thus the distance between the centers of two adjacent data tracks, such as data track 302A (track N) and data track 302B (track N−1), may be different at various points along the data tracks. As shown in FIG. 4, each data track 302A-302E may further be divided or formatted into a number of sectors, such as sectors 40A-402E (referred to herein generally as sectors 402). The sectors 402 may represent independent areas of the data track 302 in which user data is stored. It will be appreciated that the sector boundaries of one data track, such as data track 302A (track N), may not align with the sector boundaries of an adjacent data track, such as data track 302C (track N+1), as further shown in the FIG. 4. Further, the number of sectors 402 per track may vary from data track 302 to data track on the surface of the disk 202.

Returning to FIG. 2, the storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific sector 402 on the on the surface of the disk 202 by moving the read/write head 204 radially across the data tracks 302 using the actuator while a motor rotates the disk to bring the target sector under the read/write head.

According to embodiments, the controller 220 may further contain an ITIC module 228. The ITIC module 228 may compensate for inter-track interference and other noise in the read signal from the read/write head 204 when reading data. The ITIC module 228 may comprise a hardware circuit in the read/write channel 226, processor-executable instructions for execution in the processor 222 or any combination of these and other components in the controller 220. The ITIC module 228 may implement the ITIC mechanism(s) described herein. As described above, the ITIC module 228 may have the capability to calculate values for one or more ITI factors, such as alpha or cross-correlation, from the data stored in a target data track N and one or more adjacent tracks N+1, N−1, etc., and make the ITI factors available to the processor 222 and/or other components of the controller 220. The ITIC module 228 may further have the capability to utilize the calculated ITI factor values to compensate for ITI in the read signal from the read/write head 204 when reading sectors in the target data track N.

The controller 220 may further include a computer-readable storage medium or "memory" for storing processor-executable instructions, data structures and other information. The memory may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the non-volatile memory and/or the RAM may store processor-executable instructions that, when executed by the processor, perform the routines 100 and 600 for detecting adjacent track interference in the storage device 200, as described herein.

An adjacent track interference table 234 may be made available to the processor 222 to perform various operations. In some embodiments, the adjacent track interference table 234 may be stored in non-volatile memory. The adjacent track interference table 234 may store information regarding the presence of ITI detected in areas of the data tracks 302 on the surface of the disk 202, as will be described in more detail below in regard to FIG. 6. The adjacent track interference table 234 may further store the ITI factors computed by the detection methods and processes described herein. In other embodiments, the adjacent track interference table 234 may be stored in some other memory in or accessible to the controller 220, including on the disk media of the storage device 200.

In addition to the non-volatile memory and/or the RAM, the environment may include other computer-readable media storing program modules, data structures, and other data described herein for detecting adjacent track interference of the storage device 200. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include an ITI detection module 240. The ITI detection module 240 may perform the methods and processes described herein for detecting adjacent track interference in the storage device 200 using a size-adjustable sliding window. According to some embodiments, the ITI detection module 240 may be implemented in the controller 220 as software, hardware, or any combination of the two. For example, the ITI detection module 240 may be stored in the non-volatile memory as part of the firmware of the storage device 200 and may be executed by the processor 222 for performing the detection methods and processes described herein. The ITI detection module 240 may alternatively or additionally be stored in the RAM or other computer-readable media accessible by the controller 220. In further embodiments, the ITI detection module 240 may be implemented in a computing system external to and operably connected to the storage device 200 such as to perform the detection methods and processes described herein as part of the B/I process or other testing process of the storage device by the manufacturer, for example. The ITI detection module 240 may further be stored in a memory or other computer-readable media accessible by the computing system and be executed by a processor of the computing system.

It will be appreciated that the structure and/or functionality of the storage device 200 may be different that that illustrated in FIG. 2 and described herein. For example, the processor 222, read/write channel 226, non-volatile memory, RAM and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 5:
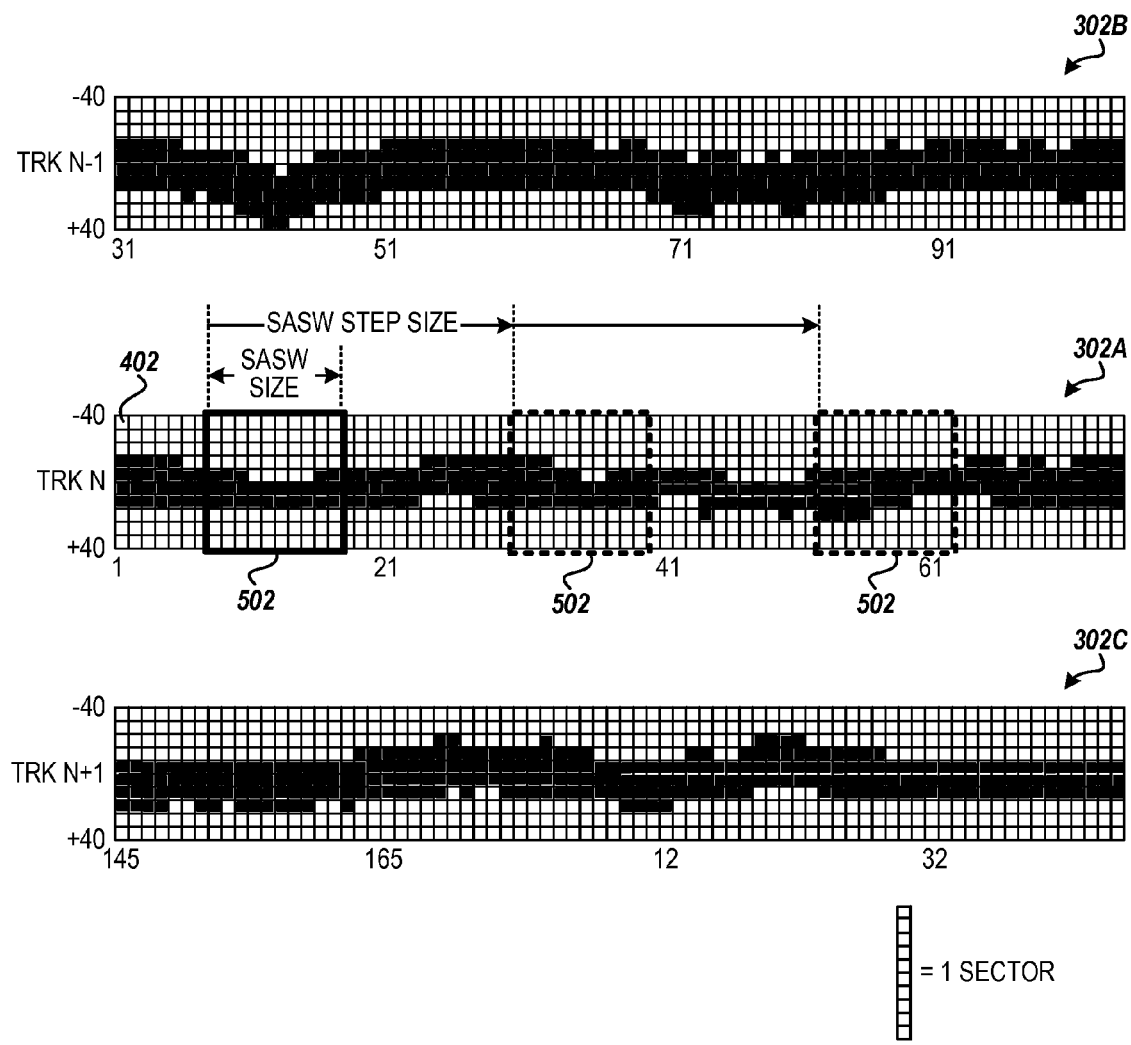
FIG. 5 is a block diagram showing an illustrative size-adjustable sliding window for the detection of adjacent-track interference on the disk media, according to embodiments described herein.

FIG. 5 shows an illustrative sector map for three adjacent data tracks on a surface of the disk 202 in the storage device 200, such as data track N 302A, data track N−1 302B and data track N+1 302C. The figure also shows an illustrative size-adjustable sliding window ("SASW") 502 that may be utilized in the detection methods and processes described herein. According to some embodiments, the SASW 502 may be sized such as to encompass multiple sectors 402 of the target data track for which ITI is being detected, such as data track N 302A. The number of sectors 402 encompassed by the SASW 502 may be small enough that fine-grained variation in ITI at different areas along the data track 302 due to variation in the track layout, for example, can be detected but large enough that separate ITI measurements in every sector of the data track are not necessary. For example the SASW may be sized to encompass five sectors 402 of the target data track 302A. In other embodiments, the SASW 502 may be sized to encompass a single sector 402 or part of a sector. The size of the SASW may be determined from the encroachment patterns of adjacent tracks, such as how many bits may be encroached by an adjacent track.

As will be described below, the SASW 502 may further be repositioned along the data track 302 during the ITI detection process by an SASW step size. According to some embodiments, the SASW step size may be set to be the same number of sectors 402 as the SASW size such that every sector 402 of the target data track 302A is included within a SASW 502 during the ITI detection process. In other embodiments, the SASW step size may be greater than the SASW size, as shown in FIG. 5. This may allow for a more efficient ITI detection routine, in that ITI need not be detected in every area of the target data track 302A. In this scenario, every sector 402 of the target data track 302A may be associated with a position of the SASW 502. In further embodiments, the SASW step size may be smaller than the SASW size.

Figure 6:
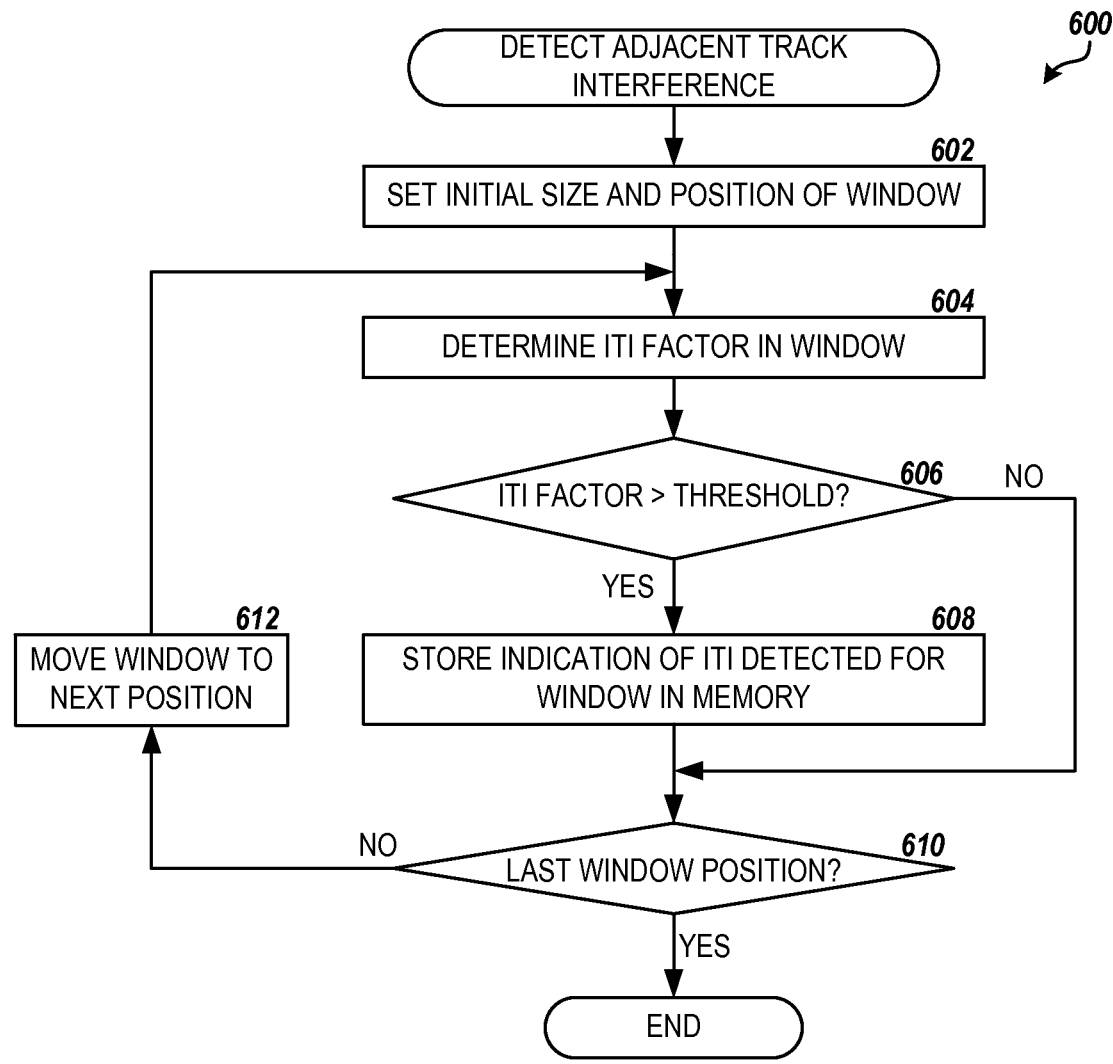
FIG. 6 is a flow diagram showing one routine for detecting adjacent track interference using a size-adjustable sliding window, according to embodiments described herein.

FIG. 6 illustrates one routine 600 for detecting adjacent track interference in a data track utilizing a size-adjustable sliding window, according to some embodiments. According to embodiments, the routine 600 may be performed at a point before reading from the storage device 200 occurs during normal operation or user mode of the device. For example, the routine 600 may be performed during the B/I process or testing of the storage device 200 by the device manufacturer. Alternatively or additionally, the routine 600 may be performed at idle times of the storage device 200 while in normal operation. In some embodiments, the routine 600 may be performed by the ITI detection module 240 described above in regard to FIG. 2. In further embodiments, the routine 600 may be performed by the controller 220 of the storage device 200, by external processors or computing systems performing the B/I process or some other combination of modules, processors and devices.

The routine 600 begins at step 602, where the ITI detection module 240 sets the initial size and position of the SASW 502 on the target data track, such as data track N 302A. As described above in regard to FIG. 5, the size of the SASW 502 may be set to encompass a number of sectors 402 in the data track 302A. For example, the SASW 502 may be sized to encompass 5 sectors 402 along the data track 302A.

Next, the routine 600 proceeds to step 604, where the ITI detection module 240 determines an ITI factor value related to interference from adjacent data track(s) within the SASW 502. In some embodiments, the ITI detection module 240 may utilize the ITIC module 228 implemented in the processor 222 and/or read/write channel 226 of the storage device 200 to determine the value of an ITI factor for the target data track and one or more adjacent tracks. For example, the ITI detection module 240 may retrieve a value for an alpha factor and/or a cross-correlation factor from the ITIC module 228 calculated from adjacent track data for compensating for interference from data track N−1 302B and data track N+1 302C in the read signal from the target data track 302A. In other embodiments, the ITI detection module 240 may calculate the ITI factor value(s) internally utilizing an algorithm or function similar to that implemented in the ITIC mechanism. It will be appreciated that any number of algorithms or methodologies may be utilized by the ITI detection to calculate one or more ITI factor values that describe interference from adjacent data track(s) within the SASW 502, and it is intended that all such algorithms or methodologies be included in the scope of this application. It will be further appreciated that the ITI detection module 240 may determine ITI factor value(s) within the SASW 502 corresponding to any number of adjacent data tracks 302B-302E.

From step 604, the routine 600 proceeds to step 606, where the ITI detection module 240 determines whether the determined ITI factor value in the SASW exceeds a threshold value. The threshold value for the particular ITI factor may be determined for a particular storage device 200 through experimentation or testing of similar storage devices during the B/I process, and may be based on a number of features or elements of the storage device and the nature of the ITI likely to occur in the device. In some embodiments, there may be multiple threshold values for the ITI factor, indicating various levels of ITI. For example, there may be two threshold values for the alpha factor in a particular model of storage device. Alpha values below the first threshold value may indicate minimal interference from an adjacent track, while alpha values equal to or above the first threshold value but below the second threshold value may indicate a medium amount of interference from the adjacent track. Alpha values equal to or above the second threshold value may indicate high levels of interference from the adjacent track. It will be appreciated that there may be any number of threshold values utilized.

If at step 606, the determined ITI factor value does not exceed the threshold value(s), then the routine 600 proceeds to step 610, described below. If the determined ITI factor value exceeds the threshold value(s), then the routine 600 proceeds to step 608, where the ITI detection module 240 stores an indication that ITI was detected in the SASW 502 for the data track 302A. In some embodiments, the ITI detection module 240 may store the indication of ITI in the SASW 502 in the adjacent track interference table 234 described above in regard to FIG. 2. The adjacent track interference table 234 may be stored in the non-volatile memory, on the disk 202 or in some other computer-readable storage medium accessible to the controller 220 of the storage device 200. In addition to the indication that ITI was detected, the ITI detection module 240 may further store an indication of the level or severity of ITI, an indication of the adjacent track(s) contributing to the ITI, the value of the ITI factors determined for the adjacent track(s), and the like. In some embodiments, the indication that ITI was detected in the SASW 502 may be stored as an entry in the adjacent track interference table 234 in a form shown below in TABLE 1:

TABLE 1

| Storage of Indication of ITI in Window | | | | | |
|---|---|---|---|---|---|
| Track | SASW Position | ITI Detected | N − 1 | N + 1 | Amount of ITI |
| N | X | 1 | 0 | 1 | Mid |

As illustrated in TABLE 1, the value N may identify the target data track 302A and the value X may identify the position of the SASW 502 along the data track in which ITI was detected. A value of "1" stored in the "ITI Detected" field may indicate that interference from one or more adjacent tracks was detected in the SASW 502, e.g., the determined value of the ITI factor in the SASW exceeded the threshold value(s). Further, a value of "1" stored in the "N−1" or "N+1" fields may indicate that interference from the adjacent N−1 data track 302B or N+1 data track 302C, respectively, was detected, while a value of "0" stored in these fields may indicate no interference from the corresponding adjacent track was detected. In further embodiments, the ITI detection module 240 may further store an "Amount of ITI" field indicating the degree of interference from the indicated adjacent track(s), such as adjacent track N−1 302B or adjacent track N+1 302C. The degree of interference from the indicated adjacent track(s) may be determined by comparing the value of the ITI factor to multiple threshold values, for example.

It will be appreciated by one skilled in the art that the tabular data shown in TABLE 1 is provided for illustrative purposes only, and that the adjacent track interference table 234 containing data indicating that ITI was detected in the SASW 502 may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice, and may depend on the technology, performance and other requirements of the processor 222, controller 220 or other elements of the storage device 200 in which the data structures are implemented. It will be further appreciated that the entry in the adjacent track interference table 234 indicating that ITI was detected in the SASW 502 may contain additional data elements beyond those shown in TABLE 1 and described above, such as the ITI factor values(s) for the window determined at step 604.

According to some embodiments, the controller 220 of the storage device 200 may utilize the data stored in the adjacent track interference table 234 to tweak read parameters in the read/write channel 226 when reading data from the disk 202 in order to reduce read errors in the user mode of the device. For example, when reading data from a sector 402 of data track N 302A associated with position X of the SASW 502, the controller 220 may utilize the "N−1," "N+1" and "Amount of ITI" fields of the corresponding entry in the adjacent track interference table 234 to determine a read-offset value for the read/write head 204 for reading the data. An indication of a medium amount of ITI from adjacent track N+1 may result in a read-offset of −10%, while an indication of a high amount of ITI from adjacent track N−1 may result in a +15% read-offset being utilized. In another example, the controller 220 may provide the ITI factor value(s) stored in the entry in the adjacent track interference table 234 associated with the target sector 402 on the data track 302 to the ITIC module 228 implemented in the processor 222 and/or read/write channel 226 of the storage device 200 to allow the ITIC module to compensate for adjacent track interference when reading data from the target sector on the disk 202.

Similarly, the controller 220 of the storage device 200 may utilize the data stored in the adjacent track interference table 234 to quickly determine the best methodology for recovering from read errors in the user mode of the device. For example, if a read error occurs in a sector 402 of the data track N 302A associated with position X of the SASW 502, the ITIC module 228 may utilize the "N−1," "N+1" and "Amount of ITI" fields of the corresponding entry in adjacent track interference table 234 to determine an initial read-offset value for re-reading the data. For the entry shown in TABLE 1 above, the ITIC module 228 may re-read the sector 402 of the data track N 302A with a read-offset of −10% to compensate for the interference compensated by adjacent track N+1 302C. Other uses of the data stored in the adjacent track interference table 234 to reduce and/or recover from read errors in the user mode of a storage device 200 may be imagined by one skilled in the art beyond those described herein. It is intended that all such uses be included in the scope of this application.

Next, the routine 600 proceeds to step 610, where the ITI detection module 240 determines if the SASW 502 is in the last position along the data track 302A in the ITI detection process. According to some embodiments, the SASW 502 may be repositioned along the target data track 302A during the ITI detection process by a SASW step size. According to some embodiments, the SASW step size may be set to be the same number of sectors 402 as the SASW size such that every sector 402 of the target data track 302A is included within a SASW 502 during the ITI detection process. In other embodiments, the SASW step size may be greater than the SASW size, as described above and shown in FIG. 5.

If the SASW 502 is not in the last position along the data track 302A, then routine proceeds from step 610 to step 612, where the ITI detection module 240 repositions the SASW 502 to the next position by moving the window by the SASW step size along the target data track 302A. From step 612, the routine 600 returns to step 604 described above. If, at step 610, the ITI detection module 240 determines that the SASW 502 is in the last position in the ITI detection process, then the routine 600 ends.

Based on the foregoing, it will be appreciated that technologies for detecting adjacent track interference in a storage device using a size-adjustable sliding window are presented herein. While embodiments are described herein in regard to an HDD device, it will be appreciated that the embodiments described in this disclosure may be utilized to detect adjacent track interference in any storage device containing data stored in substantially parallel or substantially concentric tracks on the storage media, including but not limited to, a magnetic disk drive, a hybrid magnetic and solid state drive, a magnetic tape drive, an optical disk storage device, an optical tape drive and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
    determining a value for an inter-track interference factor associated with at least one adjacent track in a first area of a data track, the first area comprising a plurality of sectors of the data track;
    determining whether the value of the inter-track interference factor is greater than a threshold; and upon determining the value of the inter-track interference factor is greater than the threshold, storing an inter-track interference indicator corresponding to the first area, the inter-track interference indicator comprising an indication of inter-track interference from the at least one adjacent track in the first area of the data track, wherein the inter-track interference indicator corresponding to the first area is utilized to compensate for inter-track interference from the at least one adjacent track during a read of a sector of the data track associated with the first area.

2. The method of claim 1, further comprising repeating the steps for a second area of the data track, the second area encompassing different sectors of the data track than the first area.

3. The method of claim 1, wherein the inter-track interference indicator corresponding to the first area comprises the value of the inter-track interference factor.

4. The method of claim 1, wherein the inter-track interference indicator corresponding to the first area is utilized to recover from a read error of the sector of the data track associated with the first area.

5. The method of claim 1, wherein determining the inter-track interference factor comprises retrieving the inter-track interference factor from an inter-track interference compensation mechanism of a read/write channel.

6. The method of claim 1, wherein the inter-track interference factor comprises an alpha factor.

7. The method of claim 1, wherein the inter-track interference indicator corresponding to the first area is stored in a non-volatile memory.

8. The method of claim 1, wherein the storing step uses an adjacent track interference table, the adjacent track interference table storing an indication of an amount of inter-track interference from the at least one adjacent track in the first area of the data track.

9. A non-transitory computer-readable storage medium having processor-executable instructions stored thereon that, when executed by a processor, cause the processor to:
determine a value for an inter-track interference factor associated with at least one adjacent track in a first area of a data track of a storage device, wherein the first area encompasses a plurality of sectors of the data track;
determine whether the value of the inter-track interference factor is greater than a threshold value; and
upon determining the value of the inter-track interference factor is greater than the threshold value, store an indication of inter-track interference corresponding to the first area, the indication of inter-track interference comprising an indication of inter-track interference from the at least one adjacent track in the first area of the data track, wherein the indication of inter-track interference corresponding to the first area is utilized to compensate for inter-track interference from the at least one adjacent track during a read of a sector within the first area of the data track.

10. The computer-readable storage medium of claim 9, having further processor-executable instructions stored thereon that cause the processor to compare the value of the inter-track interference factor to a plurality of threshold values to determine a degree of inter-track interference corresponding to the first area, where the degree of inter-track interference is stored with the indication of inter-track interference corresponding to the first area.

11. The computer-readable storage medium of claim 9, having further processor-executable instructions stored thereon that cause the processor to determine the value of the inter-track interference factor for a plurality of adjacent tracks and to store an indication of inter-track interference corresponding to the first area for each of the plurality of adjacent tracks.

12. The computer-readable storage medium of claim 9, having further processor-executable instructions stored thereon that cause the processor to repeat the steps for a second area of the data track, the second area encompassing different sectors of the data track than the first area.

13. The computer-readable storage medium of claim 9, wherein the stored indication of inter-track interference corresponding to the first area comprises the value of the inter-track interference factor.

14. The computer-readable storage medium of claim 9, wherein determining the inter-track interference factor comprises retrieving the inter-track interference factor from an inter-track interference compensation mechanism of a read/write channel of the storage device.

15. A system comprising:
a hard disk drive comprising a storage medium;
a processor operably connected to the hard disk drive; and
an ITI detection module operably connected to the processor and configured to cause the processor to
determine a value for an inter-track interference factor associated with at least one adjacent track in a first area of a data track of the storage medium,
determine whether the value of the inter-track interference factor is greater than a threshold value, and
upon determining the value of the inter-track interference factor is greater than the threshold value, store an indication of inter-track interference corresponding to the first area in a memory of the hard disk drive, the indication of inter-track interference comprising an indication of inter-track interference from the at least one adjacent track in the first area of the data track, wherein the stored indication of inter-track interference corresponding to the first area is utilized by a controller of the hard disk drive to compensate for inter-track interference from the at least one adjacent track during a read of data from the first area of the data track.

16. The system of claim 15, wherein determining the inter-track interference factor comprises retrieving the inter-track interference factor from an inter-track interference compensation mechanism of a read/write channel of the hard disk drive.

17. The system of claim 15, wherein the inter-track interference factor comprises an alpha factor.

18. The system of claim 15, wherein the inter-track interference factor comprises a cross-correlation factor.

* * * * *